United States Patent
Birsan et al.

(10) Patent No.: US 10,459,991 B2
(45) Date of Patent: Oct. 29, 2019

(54) CONTENT CONTRIBUTION VALIDATION

(71) Applicant: International Business Machines Corporation, Armonk, NY (US)

(72) Inventors: Dorian Birsan, Toronto (CA); Michael J. Harris, Rochester, MN (US); Jana Jenkins, Raleigh, NC (US); James Henry Roberts, Kirchener (CA)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 14/694,563

(22) Filed: Apr. 23, 2015

(65) Prior Publication Data

US 2016/0314204 A1  Oct. 27, 2016

(51) Int. Cl.
  *G06F 16/00*  (2019.01)
  *G06F 16/9535*  (2019.01)
(52) U.S. Cl.
  CPC .............. *G06F 16/9535* (2019.01)
(58) Field of Classification Search
  CPC .................................... G06F 16/9535
  See application file for complete search history.

(56) References Cited

U.S. PATENT DOCUMENTS

| | | | |
|---|---|---|---|
| 2008/0005101 A1* | 1/2008 | Chandra | G06F 17/30864 |
| 2008/0201651 A1* | 8/2008 | Hong | G06F 17/30722 715/764 |
| 2010/0162093 A1 | 6/2010 | Cierniak et al. | |
| 2011/0040787 A1 | 2/2011 | Cierniak et al. | |
| 2012/0158753 A1 | 6/2012 | He et al. | |
| 2012/0330968 A1* | 12/2012 | Lee | G06F 17/30722 707/748 |
| 2013/0091419 A1 | 4/2013 | Caliman et al. | |
| 2014/0250099 A1 | 9/2014 | Cierniak et al. | |
| 2014/0334794 A1 | 11/2014 | Walker | |

OTHER PUBLICATIONS

Serbanoiu, A., "Relevance-Based Ranking of Video Comments on YouTube," (CSCS), 2013 19th Int. Conf., May 29, 2013.

(Continued)

*Primary Examiner* — Paul Kim
(74) *Attorney, Agent, or Firm* — Steven M. Greenberg, Esq.; Shutts & Bowen LLP

(57) ABSTRACT

Embodiments of the invention provide a method, system and computer program product for content contribution validation. A content contribution validation method includes receiving in memory of a host computing system, from over a computer communications network, a content contribution to existing content stored in data storage coupled to the host computing system. The method also includes selecting a portion of textual terms the contribution and generating a search query utilizing the selected portion. The method yet further includes querying the existing content by a processor of the host computing system using the search query and receiving a result set from the search query. Finally, the method includes determining by the processor whether or not the result set exceeds a threshold match and applying the content contribution to the existing content in response to a determination that the result set exceeds the threshold match, but otherwise rejecting the content contribution.

9 Claims, 2 Drawing Sheets

(56) References Cited

OTHER PUBLICATIONS

Litvak, et al., "Smartnews: Towards Content-Sensitive Ranking of Comments," IJCNLP, Nagoya, Japan, Oct. 2013.
Momeni, et al., "Identification of Useful User Comments in Social Media: A Case Study on Flickr Commons," Proceedings of the 13th ACM/IEEE-CS, 2013.
Jain, et al., "Topical Organization of User Comments and Application to Content Recommendation," Proc. WWW '13 Companion Proc.of the 22nd Int. Conf. on WWW, May 2013.

* cited by examiner

CONTENT CONTRIBUTION VALIDATION

BACKGROUND OF THE INVENTION

Field of the Invention

The present invention relates to social media and more particularly to social media content management.

Description of the Related Art

Social media provides a natural platform upon which members of the public may share thoughts and ideas with respect to an unlimited number of topics. The platform of social media essentially allows two forms of content sharing—static sharing and dynamic sharing. Static sharing of content refers to content postings by one individual stored in one or more servers and indexed for viewing by other individuals from over the global Internet. In comparison, dynamic sharing of content refers to content postings by one individual stored in one or more servers and indexed for viewing and editing by other individuals from over the global Internet. Thus, the difference between static content sharing and dynamic content sharing is that in the latter instance, an unpredictable number of unknown individuals may attempt to contribute additions or modifications to posted content.

With respect to dynamic content sharing, some form of editorial control remaining with an individual editor or group of editors is desirable. Consequently, oftentimes, contributions to content are not immediately applied to the content. Instead, a manual process of editorial review is undertaken to approve or disprove depending upon the nature of the contribution. In this regard, a contribution may be disproved for common reasons such as offensive or otherwise scandalous subject matter. But just as important, content may be disproved for lack of relevancy. Specifically, so as to ensure the topical integrity of content, a proposed contribution can be approved only where the proposed contribution is consistent with the subject matter of the content itself. While automated filters can process the approval or rejection of objectionable or scandalous content based upon keyword matching, the process of filtering content based upon relevancy remains a manually intensive, tedious process.

BRIEF SUMMARY OF THE INVENTION

Embodiments of the present invention address deficiencies of the art in respect to content contribution management and provide a novel and non-obvious method, system and computer program product for content contribution validation. In an embodiment of the invention, a content contribution validation method includes receiving in memory of a host computing system, from over a computer communications network, a content contribution to existing content stored in data storage coupled to the host computing system. The method also includes selecting a portion of textual terms from the contribution and generating a search query utilizing the selected portion. The method yet further includes querying the existing content by a processor of the host computing system using the search query and receiving a result set from the search query. Finally, the method includes determining by the processor whether or not the result set exceeds a threshold match and applying the content contribution to the existing content in response to a determination that the result set exceeds the threshold match, but otherwise rejecting the content contribution.

In one aspect of the embodiment, the result set is weighted based upon a presence of one or more of the textual terms in text annotated by one or more structural elements of the existing content predetermined to be of greater importance than other structural elements of the existing content. In another aspect of the embodiment, a threshold match of the textual terms to text annotated by a structural element is determined and a difference in words computed as between the content contribution and the text annotated by a structural element. Thereafter, the difference is displayed in a window.

In another embodiment of the invention, a content management data processing system is configured for content contribution validation. The system includes a host computing system that includes at least one computer with memory and at least one processor. The system also includes a content contribution validation module executing in the memory of the host computing system. The module includes program code enabled upon execution in the memory of the host computing system to receive in the memory of the host computing system, from over a computer communications network, a content contribution to existing content stored in data storage coupled to the host computing system, to select a portion of textual terms from the contribution and generating a search query utilizing the selected portion, to query the existing content using the search query and receiving a result set from the search query, to determine by the processor whether or not the result set exceeds a threshold match and to apply the content contribution to the existing content in response to a determination that the result set exceeds the threshold match, but otherwise to reject the content contribution.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for content contribution validation. In accordance with an embodiment, a contribution for existing content can be received for application to the existing content. At least a portion of the contribution can be used as a keyword query of the existing content. A result of the query can be processed to determine whether or not a threshold match of the portion of the contribution to the existing content exists. If so, the contribution can be determined to be relevant to the existing content and applied to the existing content. Otherwise, the contribution can be determined to lack relevancy and rejected.

Figure 1:
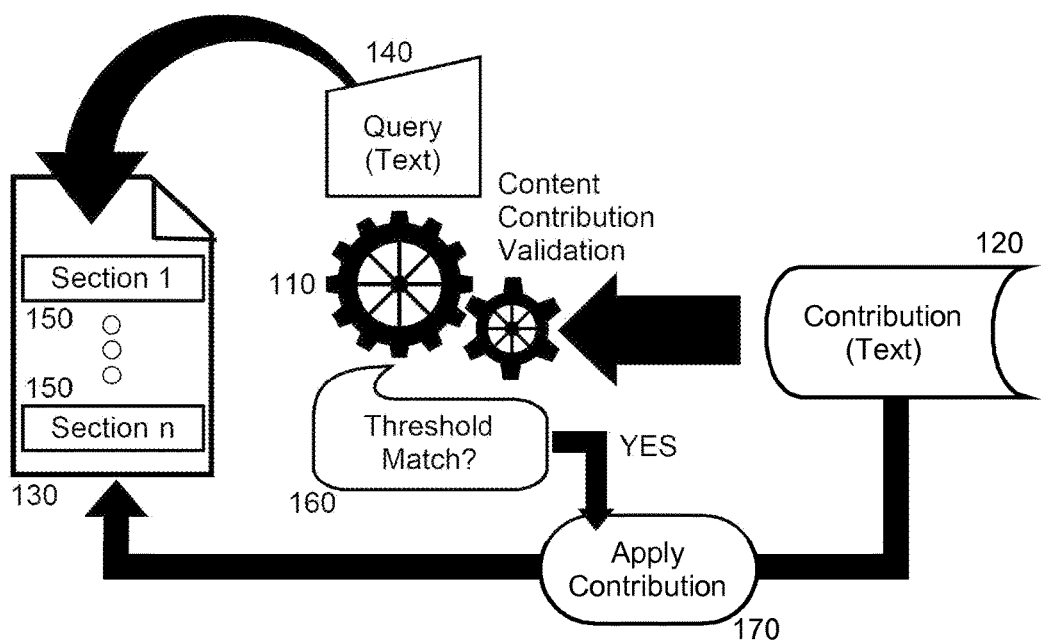
FIG. 1 is a pictorial illustration of a process for content contribution validation.

In further illustration, FIG. 1 pictorially shows a process for content contribution validation. As shown in FIG. 1, content contribution validation logic 110 can receive a content contribution 120 of text to be applied as a modification to or augmentation of content 130. The content contribution validation logic 110 can generate a query expression 140 based upon the text of the content contribution 120. Thereafter, the content contribution validation logic 110 can apply the query expression 140 to the content 130. To the extent that a threshold match 160 is determined by the content contribution validation logic 110, the content contribution validation logic 110 can direct the application 170 of the contribution 120 to the content 130. Otherwise, the content contribution validation logic 110 can direct the disregarding of the contribution 120.

Optionally, the content contribution validation logic 110 can identify structural sections 150 of the content 130. The structural sections 150 each are defined by a structural annotation or pair of annotations such as that which is common in hypertext markup language or other markup languages in general. For those sections 150 determined to be of particular relevance, such as sections 150 for headings, or titles, a portion of a result set from the query expression 140 resulting from matching text within those of the sections 150 determined to be a particular relevance can be weighted more important than portions of the result set from the query expression 140 resulting from matching text in others of the sections 150.

Figure 2:
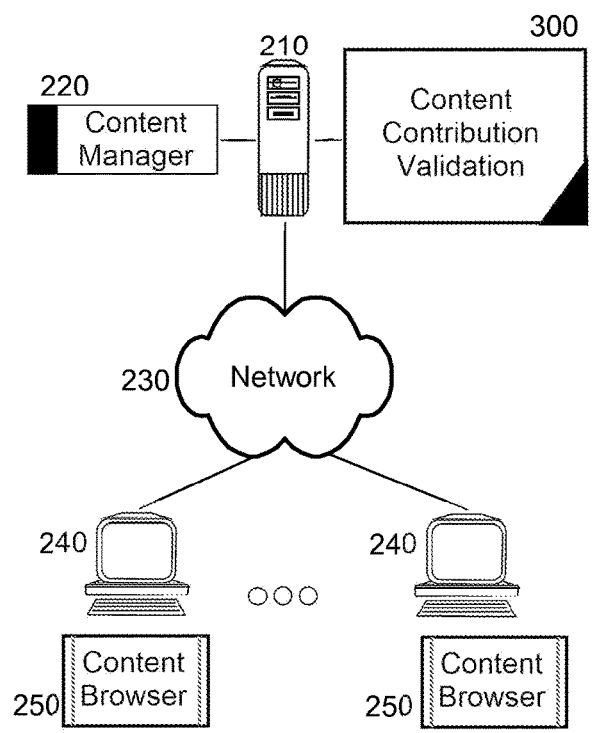
FIG. 2 is a schematic illustration of a content management data processing system configured for content contribution validation; and, FIG. 3 is a flow chart illustrating a process for content contribution validation.

The process illustrated in connection with FIG. 1 can be implemented in a content management data processing system. In yet further illustration, FIG. 2 schematically shows a content management data processing system configured for content contribution validation. The system includes a host computing system 210 that includes one or more computers, each with memory and at least one processor. The host computing system 210 can support the operation of a content manager 220 managing content distributed for viewing in different content browsers 250 executing in different client computers 240 from over computer communications network 230. In this regard, content manager 220 can be configured to receive contributions of text to structured content managed by the content manager 220.

Of note, a content contribution validation module 300 is coupled to the content manager 220 and executes in the memory of the host computing system 210. The content contribution validation module 300 can include program code that when executed in the memory of the host computing system 210, is enabled to process a contribution to content by generating a query to the content using the text of the contribution, to determine whether or not a threshold number of terms in the text can be found in the content, and in response to determining that a threshold number of the terms in the text match text in the content, to apply the contribution to the content, but otherwise to reject the application of the contribution of the content.

Figure 3:
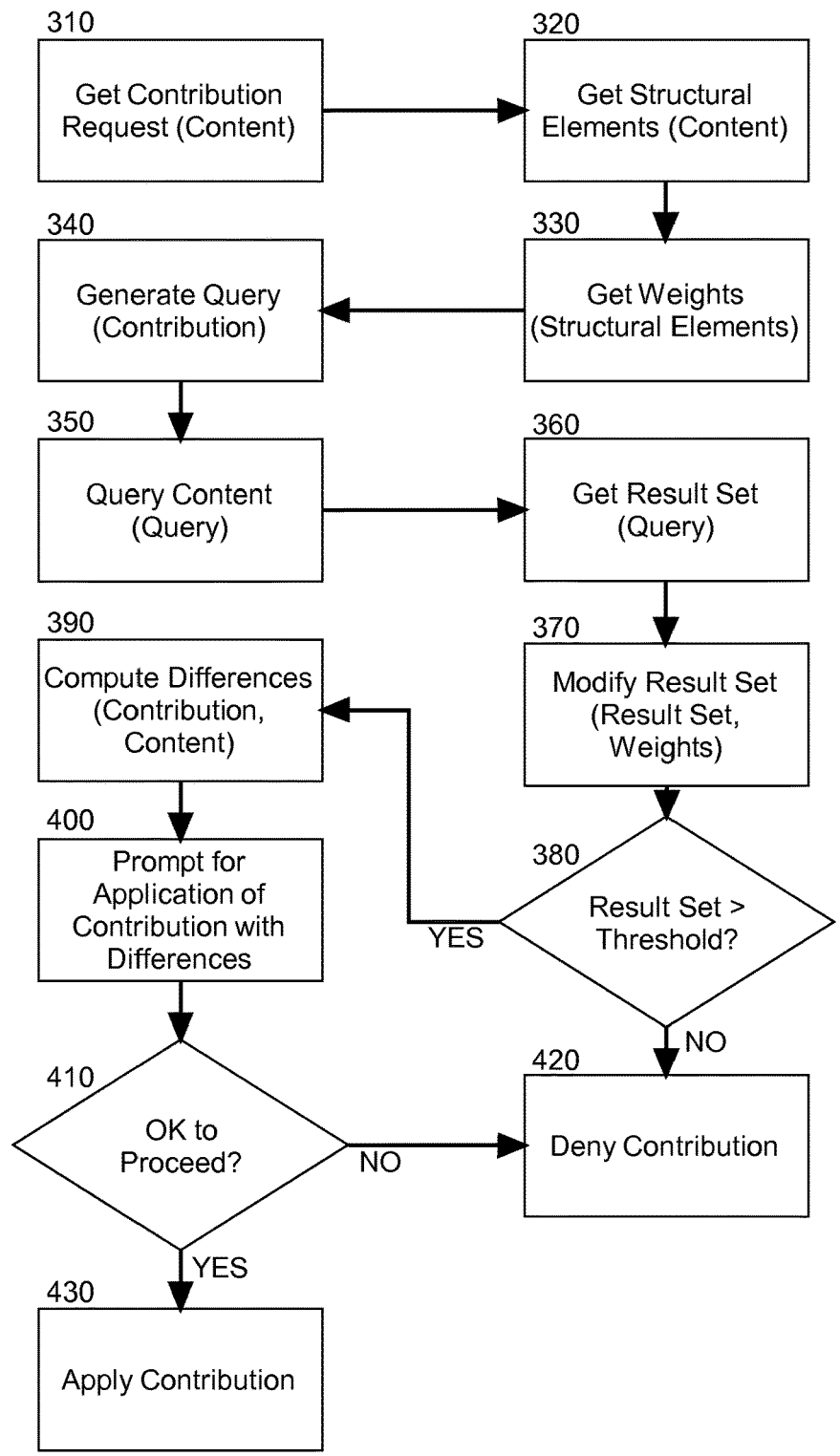

In even yet further illustration of the operation of the content contribution validation module 300, FIG. 3 is a flow chart illustrating a process for content contribution validation. The process can begin in block 310 in which a request to add a contribution to content is received. The contribution can include one or more words of text to be added to the content, or to replace existing text in the content, or to modify existing text in the content. In block 320, one or more structural elements of the content can be identified. For example, one or more markup tags annotating different textual portions of the content can be identified. Thereafter, in block 330 different weights for the different identified structural elements can be retrieved into memory and in block 340, a query expression can be generated utilizing the text of the content contribution.

In block 350, the generated query expression can be applied to the content and in block 360, a result set of matching text in the content can be received. In block 370, the result set of matching text can be weighted in that text of the query expression matching text annotated by the identified structural elements can be weighted more favorably based upon matching text subsisting in sections of the content annotated by corresponding structural elements and deemed more important than other sections. Thereafter, in decision block 380 it can be determined whether or not the now weighted result set exceeds a pre-determined threshold. If not, the request to apply the contribution to the content can be denied in block 420. Otherwise, the process can continue in block 390.

In block 390, the difference between the contribution and the text of the content to be replaced by the contribution can be computed and in block 400, a prompt can be generated indicating the computed difference. The prompt also can include an option for the end user to proceed in applying the contribution to the content, or to deny the contribution. In decision block 410, if it is determined to apply the contribution to the content, in block 430 the contribution is applied to the content. Otherwise, in block 420 the request to apply the contribution to the content is denied in block 420.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A content contribution validation method comprising:
 loading a multi-section document in memory of a host computing system;

receiving in the host computing system from a remote computer from over a computer communications network, a request to add text to the multi-section document;

generating a text search query using a word in the text of the request;

executing the query in the host computing system, the execution of the query searching each section of the multi-section document and locating therein different matching instances of the word in a query result set;

counting in the query result set a number of instances when the word is located in the multi-section document as a result of the query; and, on condition that the count fails to exceed a threshold value, determining the text of the request to be unrelated to already existing content of the document and thus irrelevant and rejecting the request, but otherwise determining the text of the request to be related to already existing content of the document and thus relevant and in response to the determination, adding the text of the request to the multi-section document.

2. The method of claim 1, wherein the result set is weighted based upon a presence of one or more of the textual terms in text annotated in the document by one or more structural elements predetermined to be of greater importance than other structural elements of the existing content.

3. The method of claim 1, further comprising:

computing a difference between all words in the text of the request and all terms in the document that had been annotated by a corresponding structural element; and, displaying the computed difference in a window.

4. A content management data processing system configured for content contribution validation, the system comprising:

a host computing system comprising at least one computer with memory and at least one processor; and, a content contribution validation module executing in the memory of the host computing system, the module comprising program code enabled upon execution in the memory of the host computing system to perform:

loading a multi-section document in the memory of the host computing system;

receiving in the host computing system from a remote computer from over a computer communications network, a request to add text to the multi-section document;

generating a text search query using a word in the text of the request;

executing the query in the host computing system, the execution of the query searching each section of the multi-section document and locating therein different matching instances of the word in a query result set;

counting in the query result set a number of instances when the word is located in the multi-section document as a result of the query; and, on condition that the count fails to exceed a threshold value, determining the text of the request to be unrelated to already existing content of the document and thus irrelevant and rejecting the request, but otherwise determining the text of the request to be related to already existing content of the document and thus relevant and in response to the determination, adding the text of the request to the multi-section document.

5. The system of claim 4, wherein the result set is weighted based upon a presence of one or more of the textual terms in text annotated in the document by one or more structural elements predetermined to be of greater importance than other structural elements of the existing content.

6. The system of claim 4, wherein the program code is further enabled to perform:

computing a difference between all words in the text of the request and all terms in the document that had been annotated by a corresponding structural element; and, displaying the computed difference in a window.

7. A computer program product for content distribution validation, the computer program product comprising a non-transitory computer readable storage medium having program instructions embodied therewith, the program instructions executable by a device to cause the device to perform a method comprising:

loading a multi-section document in memory of a host computing system;

receiving in the host computing system from a remote computer from over a computer communications network, a request to add text to the multi-section document;

generating a text search query using a word in the text of the request;

executing the query in the host computing system, the execution of the query searching each section of the multi-section document and locating therein different matching instances of the word in a query result set;

counting in the query result set a number of instances when the word is located in the multi-section document as a result of the query; and, on condition that the count fails to exceed a threshold value, determining the text of the request to be unrelated to already existing content of the document and thus irrelevant and rejecting the request, but otherwise determining the text of the request to be related to already existing content of the document and thus relevant and in response to the determination, adding the text of the request to the multi-section document.

8. The computer program product of claim 7, wherein the result set is weighted based upon a presence of one or more of the textual terms in text annotated in the document by one or more structural elements predetermined to be of greater importance than other structural elements of the existing content.

9. The computer program product of claim 7, wherein the method further comprises:

computing a difference between all words in the text of the request and all terms in the document that had been annotated by a corresponding structural element; and, displaying the computed difference in a window.

* * * * *